(12) United States Patent
Stern-Berkowitz et al.

(10) Patent No.: US 7,308,264 B2
(45) Date of Patent: Dec. 11, 2007

(54) METHOD FOR IDENTIFYING PRE-CANDIDATE CELLS FOR A MOBILE UNIT OPERATING WITH A SWITCHED BEAM ANTENNA IN A WIRELESS COMMUNICATION SYSTEM, AND CORRESPONDING SYSTEM

(75) Inventors: Janet Stern-Berkowitz, Little Neck, NY (US); Ana Lucia Iacono, Garden City, NY (US); Kambiz Casey Zangi, Durham, NC (US)

(73) Assignee: Interdigital Technology Corporation, Wilmington, DE (US)

( * ) Notice: Subject to any disclaimer, the term of this patent is extended or adjusted under 35 U.S.C. 154(b) by 500 days.

(21) Appl. No.: 11/051,138

(22) Filed: Feb. 4, 2005

(65) Prior Publication Data

US 2005/0176469 A1    Aug. 11, 2005

Related U.S. Application Data

(60) Provisional application No. 60/541,967, filed on Feb. 5, 2004.

(51) Int. Cl.
*H04Q 7/20* (2006.01)
(52) U.S. Cl. ............ 455/442; 455/63.4; 455/436; 342/354; 342/367
(58) Field of Classification Search ............ 455/62, 455/63.4, 101, 269, 436, 442, 443, 450, 550.1, 455/562.1, 575.7, 277.1–278.1; 342/81, 342/154, 354, 367, 368; 343/757, 777, 824
See application file for complete search history.

(56) References Cited

U.S. PATENT DOCUMENTS

| | | | |
|---|---|---|---|
| 3,846,799 A | 11/1974 | Gueguen | 343/833 |
| 5,905,473 A | 5/1999 | Taenzer | 343/834 |
| 5,966,384 A * | 10/1999 | Felix et al. | 370/465 |

(Continued)

FOREIGN PATENT DOCUMENTS

GB    2317077    11/1998

(Continued)

OTHER PUBLICATIONS

Ohira et al., Electronically Steerable Passive Array Radiator Antennas for Low-Cost Analog Adaptive Beamforming, 0-7803-6345-0/00, 2000, IEEE.

(Continued)

*Primary Examiner*—William Trost
*Assistant Examiner*—James Ewart
(74) *Attorney, Agent, or Firm*—Allen, Dyer, Doppelt, Milbrath & Gilchrist, P.A.

(57) ABSTRACT

Measurements for identifying pre-candidate cells are made by a wireless transmit/receive unit (WTRU) operating with a switched beam antenna in a wireless communication system. The switched beam antenna is a smart antenna generating a plurality of directional beams and an omni-directional beam. The WTRU measures signals from cells not in an active set of cells to define a pre-candidate set of cells. Measured signals from cells in the pre-candidate set of cells are compared to a threshold, and the corresponding cells are moved from the pre-candidate set of cells to a candidate set of cells based upon the comparison to the threshold. A measurement report is then sent to the network.

27 Claims, 8 Drawing Sheets

U.S. PATENT DOCUMENTS

| | | | |
|---|---|---|---|
| 6,055,428 A | 4/2000 | Soliman | 455/437 |
| 6,229,486 B1 * | 5/2001 | Krile | 343/700 MS |
| 6,233,455 B1 | 5/2001 | Ramakrishna et al. | 455/437 |
| 6,304,215 B1 * | 10/2001 | Proctor et al. | 342/372 |
| 6,370,369 B1 * | 4/2002 | Kraiem et al. | 455/277.1 |
| 6,404,386 B1 * | 6/2002 | Proctor et al. | 342/368 |
| 6,456,257 B1 * | 9/2002 | Zamat | 343/876 |
| 6,456,604 B1 * | 9/2002 | Lee et al. | 370/328 |
| 6,515,635 B2 * | 2/2003 | Chiang et al. | 343/834 |
| 6,600,456 B2 * | 7/2003 | Gothard et al. | 343/834 |
| 6,697,610 B1 * | 2/2004 | Tait | 455/277.1 |
| 6,697,642 B1 * | 2/2004 | Thomas | 455/562.1 |
| 6,725,062 B1 * | 4/2004 | Paranchych | 455/561 |
| 6,771,622 B1 * | 8/2004 | Banerjee | 370/331 |
| 6,834,190 B1 * | 12/2004 | Lee et al. | 455/436 |
| 7,065,373 B2 * | 6/2006 | Rodgers et al. | 455/502 |
| 7,136,483 B2 * | 11/2006 | Khaleghi et al. | 379/448 |
| 2001/0024431 A1 * | 9/2001 | Koo et al. | 370/335 |
| 2002/0071403 A1 * | 6/2002 | Crowe et al. | 370/331 |
| 2002/0137538 A1 * | 9/2002 | Chen et al. | 455/550 |
| 2003/0114172 A1 * | 6/2003 | Soliman | 455/456 |
| 2003/0222818 A1 * | 12/2003 | Regnier et al. | 342/383 |
| 2003/0228857 A1 * | 12/2003 | Maeki | 455/278.1 |
| 2004/0023634 A1 * | 2/2004 | Jeong et al. | 455/403 |
| 2004/0029534 A1 * | 2/2004 | Odenwalder | 455/67.11 |
| 2004/0043798 A1 | 3/2004 | Amerga et al. | 455/574 |
| 2004/0116110 A1 * | 6/2004 | Amerga et al. | 455/422.1 |
| 2004/0127220 A1 * | 7/2004 | Proctor, Jr. | 455/442 |
| 2004/0147287 A1 | 7/2004 | Nelson, Jr. et al. | 455/561 |

FOREIGN PATENT DOCUMENTS

| | | |
|---|---|---|
| WO | 96/16524 | 5/1996 |
| WO | 03/077433 | 9/2003 |
| WO | 03/107577 | 12/2003 |
| WO | 2005/065171 | 7/2005 |

OTHER PUBLICATIONS

Scott et al., Diversity Gain From a Single-Port Adaptive Antenna Using Switched Parasitic Elements Illustrated with a Wire and Monopole Prototype, IEEE Transactions on Antennas and Propagation, vol. 47, No. 6, Jun. 1999.

King, The Theory of Linear Antennas, pp. 622-637, Harvard University Press, Cambridge, Mass., 1956.

Lo et al., Antenna Handbook: Theory, Applications and Design, pp. 21-38, Van Nostrand Reinhold Co., New York, 1988.

* cited by examiner

METHOD FOR IDENTIFYING PRE-CANDIDATE CELLS FOR A MOBILE UNIT OPERATING WITH A SWITCHED BEAM ANTENNA IN A WIRELESS COMMUNICATION SYSTEM, AND CORRESPONDING SYSTEM

RELATED APPLICATION

This application claims the benefit of U.S. Provisional Application Ser. No. 60/541,967 filed Feb. 5, 2004, the entire contents of which are incorporated herein by reference.

FIELD OF THE INVENTION

The present invention relates to the field of wireless communications, and more particularly, to the handoff of a mobile wireless transmit/receive unit (WTRU) operating with a switched beam antenna in a multi-cell wireless communication system.

BACKGROUND OF THE INVENTION

In a wireless multi-cell communication system, a mobile WTRU typically moves from one cell to another. As the WTRU crosses the boundary of a cell, a handoff is initiated. A handoff is a procedure in which communication in an active cell is transferred to another cell without interruption. During soft handoff, the same data is received and transmitted between the WTRU and the two cells.

The terminology "active set" refers to the set of cells communicating (i.e., transmitting and receiving data) with the WTRU. One or more cells are in the active set of cells.

To support soft handoff, the WTRU performs physical measurements on the signals received from cells in the active set and from neighboring cells. These measurements are reported to a network or network controller based on the occurrence of one or more triggering events. Depending on the requirements of the wireless communication system, more than one threshold may be established for measurement reporting.

In a code division multiple access 2000 (CDMA2000) system, for example, a WTRU measures the strength of pilot signals transmitted by cells in the active set and by neighboring cells. When the strength of a pilot signal from a neighboring cell exceeds a predetermined pilot detection threshold, T_ADD, or exceeds the strength of a pilot signal from a cell in the active set of cells by 0.5×T_COMP dB, where T_COMP is a comparison threshold, the WTRU reports the measurement results to the network. Based on the measurement results reported by the WTRU, the network decides whether or not to assign a channel to the WTRU in a target cell.

In some systems, such as the CDMA2000 system, neighbor cells whose strength have crossed a network specified threshold but are not strong enough to be in the active set of cells are referred to as a "candidate set" of cells. Measurement reports are sent to the network when cells are added to the candidate set, and when cells are strong enough to be considered for the active set. The terminology "candidate set" hereinafter refers to the set of neighboring cells (i.e., cells not in the active set) for which the WTRU reports measurements to the network when network specified criteria are met. The CDMA2000 candidate set is just one example of this.

The terminology "selected beam" refers to the antenna beam that a WTRU uses for its data transmission and reception. A WTRU using a switched beam antenna typically performs the measurements on the neighboring cells using the selected beam. Triggering events for measurement reporting are based on the measurements made using the selected beam.

The thresholds for measurement reporting (e.g., T_ADD and/or T_COMP) are usually established under the assumption that the WTRU uses an omni-directional antenna, instead of a switch beam antenna. A switch beam antenna (i.e., a smart antenna), generates a narrow beam which advantageously increases the signal strength in a wireless communication system. However, when the WTRU uses a switch beam antenna to communicate with a serving base station, the antenna steers to a particular direction, and therefore, the physical measurements on the signals from neighboring cells may be affected by the antenna direction.

A conventional wireless communication system 100 including a WTRU 120 utilizing a switched directional beam 140 in communication with a serving cell including a base station (BS) 160 is illustrated in FIG. 1. Since the gain of the directional beam 140 is directed in a particular direction, the signals from the base stations 180 in neighboring cells may not be properly detected even if the neighboring cells are closer than the serving cell 160.

The received signal power from the neighboring cells may be too low in amplitude to trigger the transmission of a measurement report to the network. Thus, a soft handoff may not be triggered which could lead to a higher rate of hard handoffs and increase the number of dropped calls.

SUMMARY OF THE INVENTION

In view of the foregoing background, an object of the invention is to more quickly identify candidate cells used in the handoff of a mobile wireless transmit/receive unit (WTRU) operating with a switched beam antenna in a multi-cell wireless communication system.

This and other objects, features, and advantages in accordance with the present invention are provided by a method for performing measurements by a wireless transmit/receive unit (WTRU) operating with a switched beam antenna in a wireless communication system for identifying pre-candidate cells. The switched beam antenna is a smart antenna generating a plurality of directional beams and an omni-directional beam. The WTRU measures signals from cells not in an active set of cells to define a pre-candidate set of cells. Measured signals from cells in the pre-candidate set of cells are compared to a threshold, and the corresponding cells are moved from the pre-candidate set of cells to a candidate set of cells based upon the comparison to the threshold. A measurement report is then sent to the network.

More particularly, the method comprises using a selected antenna beam for exchanging data with a cell in an active set of cells, receiving signals from cells not in the active set of cells using the selected antenna beam, and measuring the received signals from each cell not in the active set of cells for the selected antenna beam.

The measured signals are compared to an add pre-candidate set threshold, and the corresponding cells are added to a pre-candidate set of cells based upon the comparison. The cells in the pre-candidate set of cells may be ranked based upon a level of their measured signals. Signals from N of the top-ranked cells in the pre-candidate set of cells are received using the omni-directional beam and the selected antenna beam, with N being greater than or equal to 1.

The received signals from each of the N cells are measured for the omni-directional beam and the selected antenna beam. The measured signals are compared to an add candidate set threshold, and the corresponding cells are dropped from the pre-candidate set of cells and added to the candidate set of cells based upon the comparison to the add candidate set threshold. A measurement report may then be sent to the network.

The method may further comprise receiving signals from the cells in the candidate set of cells using the omni-directional beam, and measuring the received signals from each cell for the omni-directional beam. The measured signals may be compared to an add active set threshold, and sending a measurement report to the network based upon the comparison to the add candidate set threshold.

Defining a pre-candidate set of cells advantageously allows candidate cells to be identified before they would normally be if only selected beam measurements were performed. Once cells in the pre-candidate set of cells are identified, they may be moved to the candidate set of cells more quickly to support a soft handoff once these cells are moved to the active set of cells. The present invention advantageously helps to maintain connectivity of the mobile WTRU operating with a switched beam antenna in a multi-cell wireless communication system.

Another aspect of the present invention is directed to a wireless communication system comprising an active set of cells, cells not in the active set of cells, and a WTRU for implementing the above described method. The WTRU may comprise the switched beam antenna, a transceiver connected to the switched beam antenna, a measuring unit connected to the transceiver for measuring the received signals, a threshold unit for storing thresholds, and a controller for comparing the measured signals to the thresholds, and for also sending measurement reports to the network.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
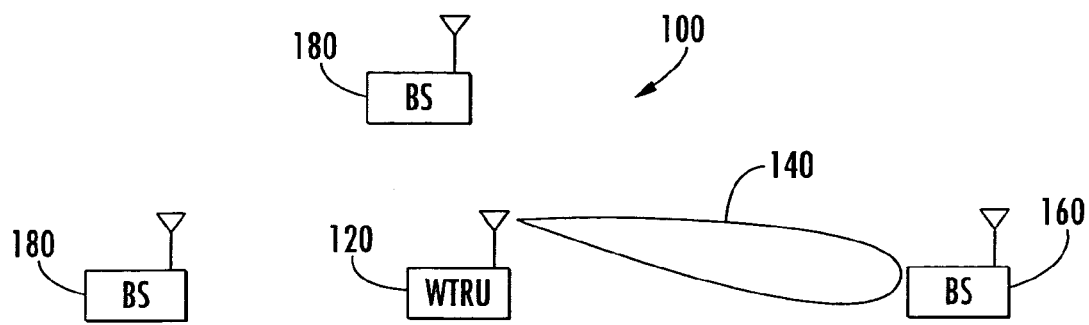
FIG. 1 is schematic diagram of a wireless communication system and a wireless transmit/receive unit (WTRU) operating therein in accordance with the prior art.
Figure 2:
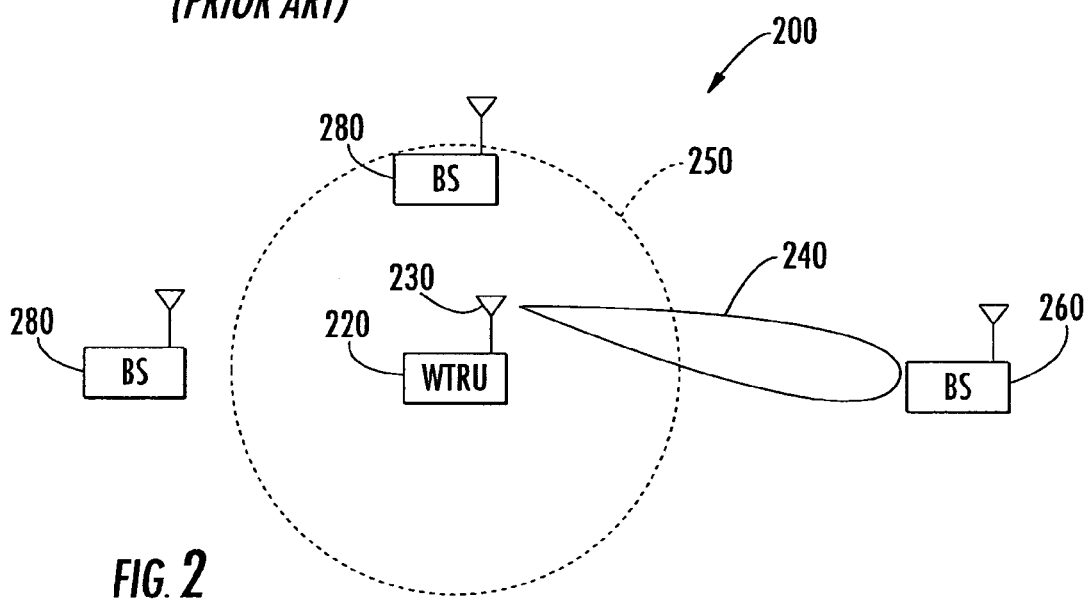
FIG. 2 is schematic diagram of a wireless communication system and a wireless transmit/receive unit (WTRU) operating therein in accordance with the present invention.
Figure 3:
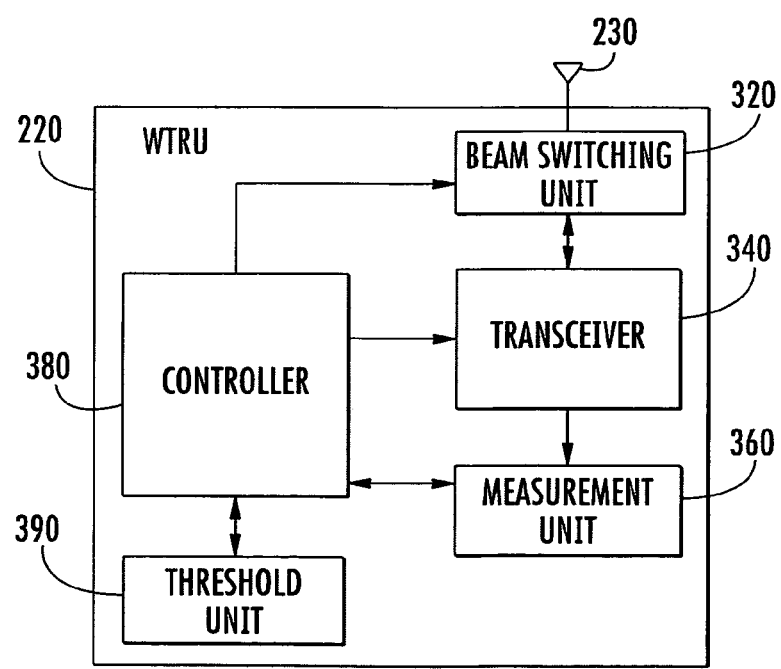
FIG. 3 is a block diagram of the WTRU illustrated in FIG. 2.

Referring initially to FIGS. 2 and 3, a wireless communications system 200 and a wireless transmit/receive unit (WTRU) 220 for operating in the wireless communication system will be discussed. The WTRU 220 includes a switched beam antenna 230 for generating antenna beams including a plurality of directional beams 240 and an omni-directional beam 250. The illustrated directional beam 240 is a switched beam for communicating with a serving cell 260 before or after handoff. As will be discussed in greater detail below, the omni-directional beam 250 and/or the directional beam 240 are used for handoff, including detection of a triggering event by measuring signals from the neighboring cells 280.

The base stations 260, 280 may be site controllers, access points or any other type of interfacing devices in a wireless environment as readily appreciated by those skilled in the art. The wireless communication system 200 may be applicable, for example, to time division duplexing (TDD), frequency division multiplexing (FDD) and time division synchronous code division multiple access (TD-SCDMA) as applied to a universal mobile telecommunications system (UMTS), a code division multiple access (CDMA) 2000 system, and to CDMA in general, as readily appreciated by those skilled in the art.

The WTRU 220 includes devices capable of operating in a wireless environment, such as user equipment (UE), mobile stations, mobile subscriber units and pagers, for example. The WTRU 220 comprises a beam switching unit 320 connected to the switched beam antenna 230, a transceiver 340 connected to the beam switching unit, and a measurement unit 360 connected to the transceiver, as illustrated in FIG. 3. The measurement unit 360 measures the signals received from the different cells. For a CDMA system, pilot signals are preferably used for these measurements. However, any other signals transmitted from the cells may be used for this purpose.

A controller 380 is connected to the transceiver 340, to the measurement unit 360, and to the beam switching unit 320 for control thereof. A threshold unit 390 is also connected to the controller 380. The threshold unit 390 may comprise a memory for storing threshold values used for comparison with the measurements performed by the measurement unit 360. As will be discussed in greater detail below, the threshold values include parameters for pre-candidate and candidate cells as set by the controller 380.

Six different preferred embodiments of the method for performing antenna beam measurements and reporting of the measurements to the network while operating with the switched beam antenna will now be discussed. In all of the embodiments, regardless of the beams used for measurements, the selected beam continues to be used for communication with the base stations in the active set of cells.

Figure 4:
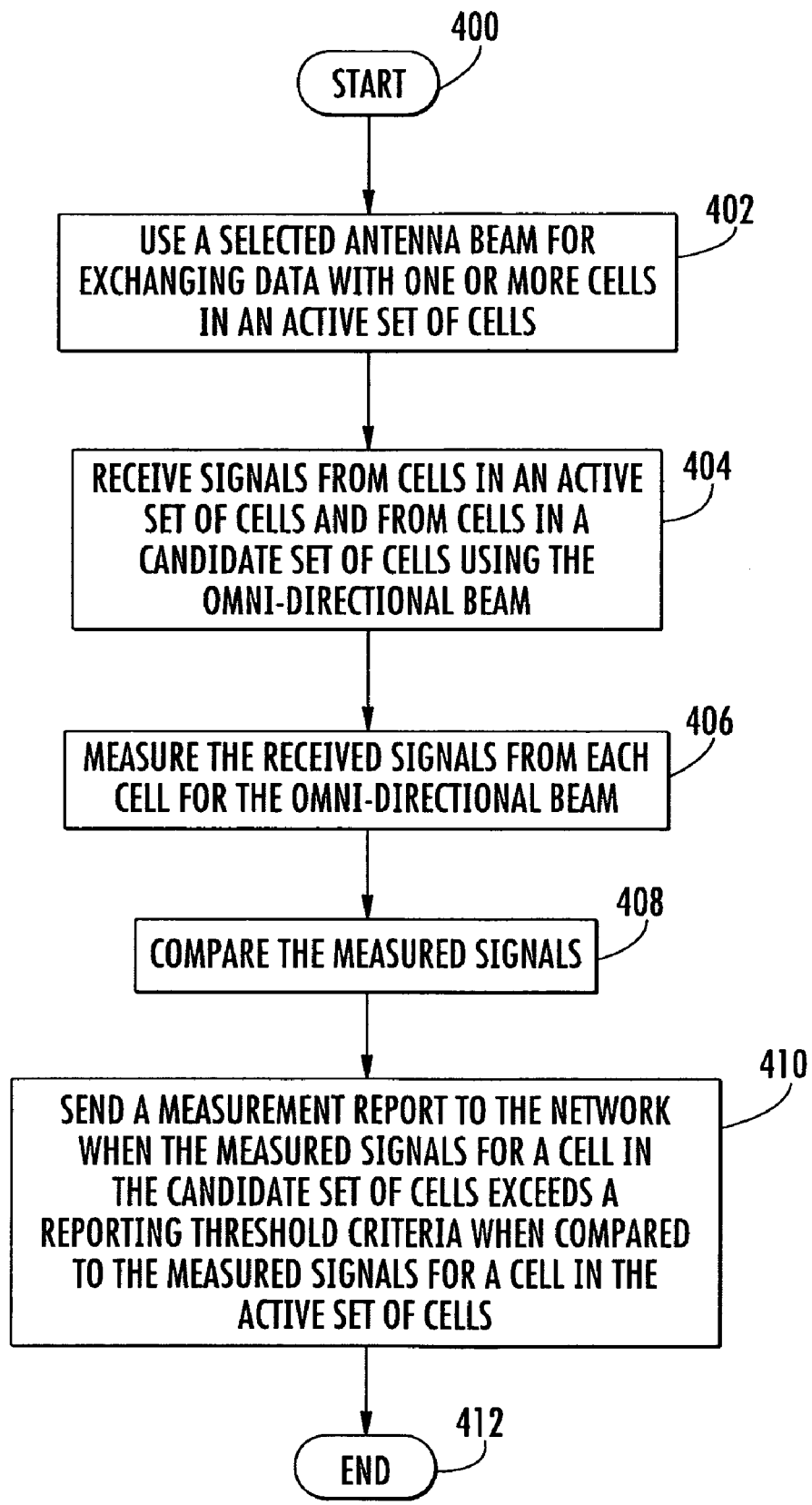
FIGS. 4-9 are flow diagrams of respective embodiments for performing measurements for handoff of the WTRU in the wireless communication system illustrated in FIG. 2.

The first embodiment of the method for performing antenna beam measurements and reporting of the measurements to the network while operating with the switched beam antenna 230 is illustrated in the flow diagram in FIG. 4. From the start (Block 400), the WTRU 220 uses a selected antenna beam for exchanging data with one or more cells in an active set of cells at Block 402, receives signals from cells in the active set of cells and from cells in the candidate set of cells using the omni-directional beam 250 at Block 404. The received signals for the omni-directional beam 250 are measured at Block 406.

The WTRU 220 compares the measured signals in the omni-directional beam 250 at Block 408. A measurement report is sent to the network at Block 410 when the measured signals for a cell in the candidate set of cells exceeds a reporting threshold criteria when compared to the measured signals for a cell in the active set of cells. The method ends at Block 412. This process repeats from Block 400 for the next set of measurements to be performed.

Figure 5:
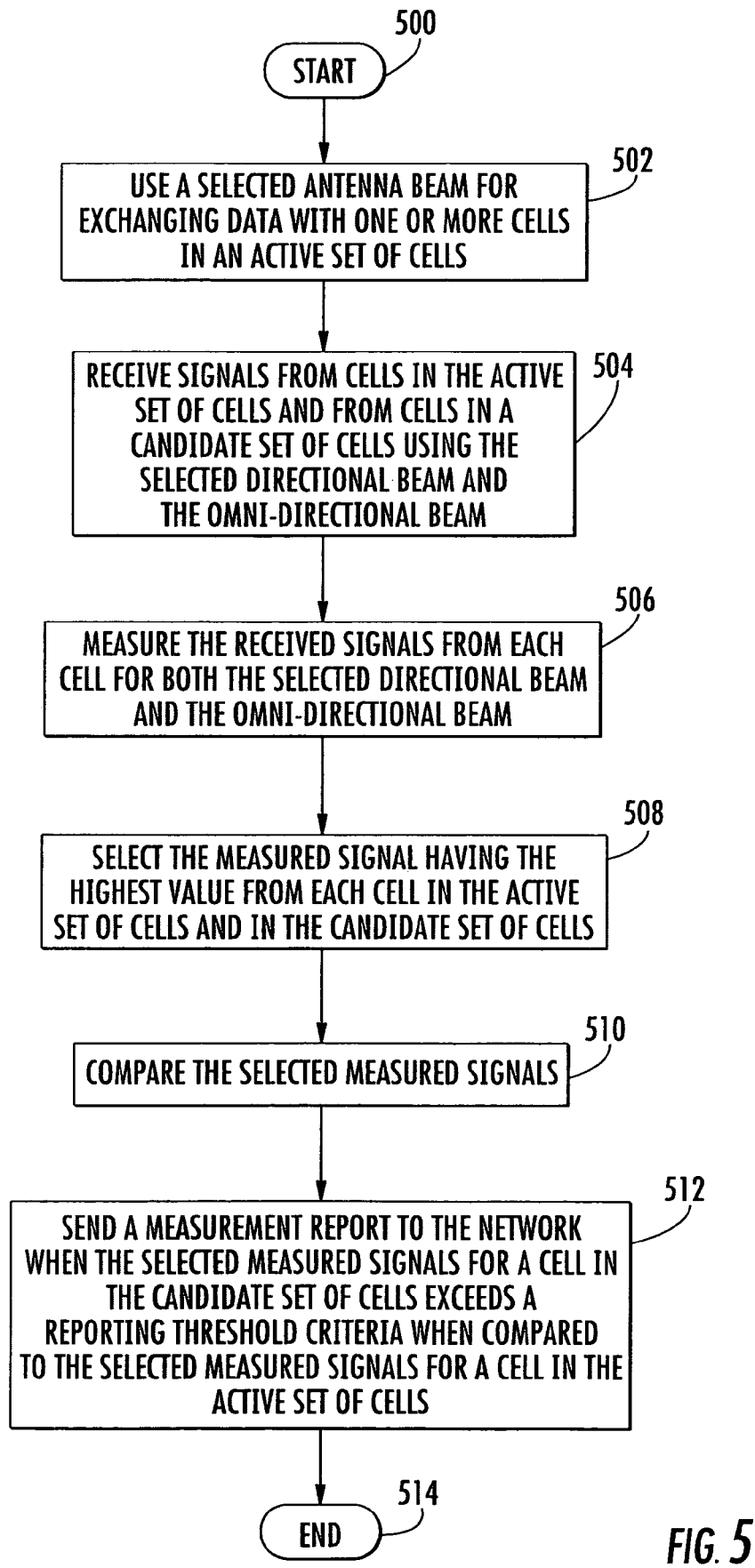

The second embodiment is illustrated in the flow diagram of FIG. 5. From the start (Block 500), the WTRU 220 uses a selected antenna beam for exchanging data with a cell in the active set of cells at Block 502.

Signals are received from cells in the active set of cells and from cells in a candidate set of cells using the selected directional beam and the omni-directional beam at Block 504. The received signals for both the selected directional beam and the omni-directional beam are measured at Block 506. The measured signal having the highest value from each cell in the active set of cells and in the candidate set of cells are selected at Block 508. That is, for each cell, the highest measured signal (the omni-directional beam measurement or the selected directional beam measurement) is selected.

The selected measured signals are compared at Block 510. A measurement report is sent to the network at Block 512 when the selected measured signals for a cell in the candidate set of cells exceeds a reporting threshold criteria when compared to the selected measured signals for a cell in the active set of cells. The method ends at Block 514. This process repeats from Block 500 for the next set of measurements to be performed.

Figure 6:
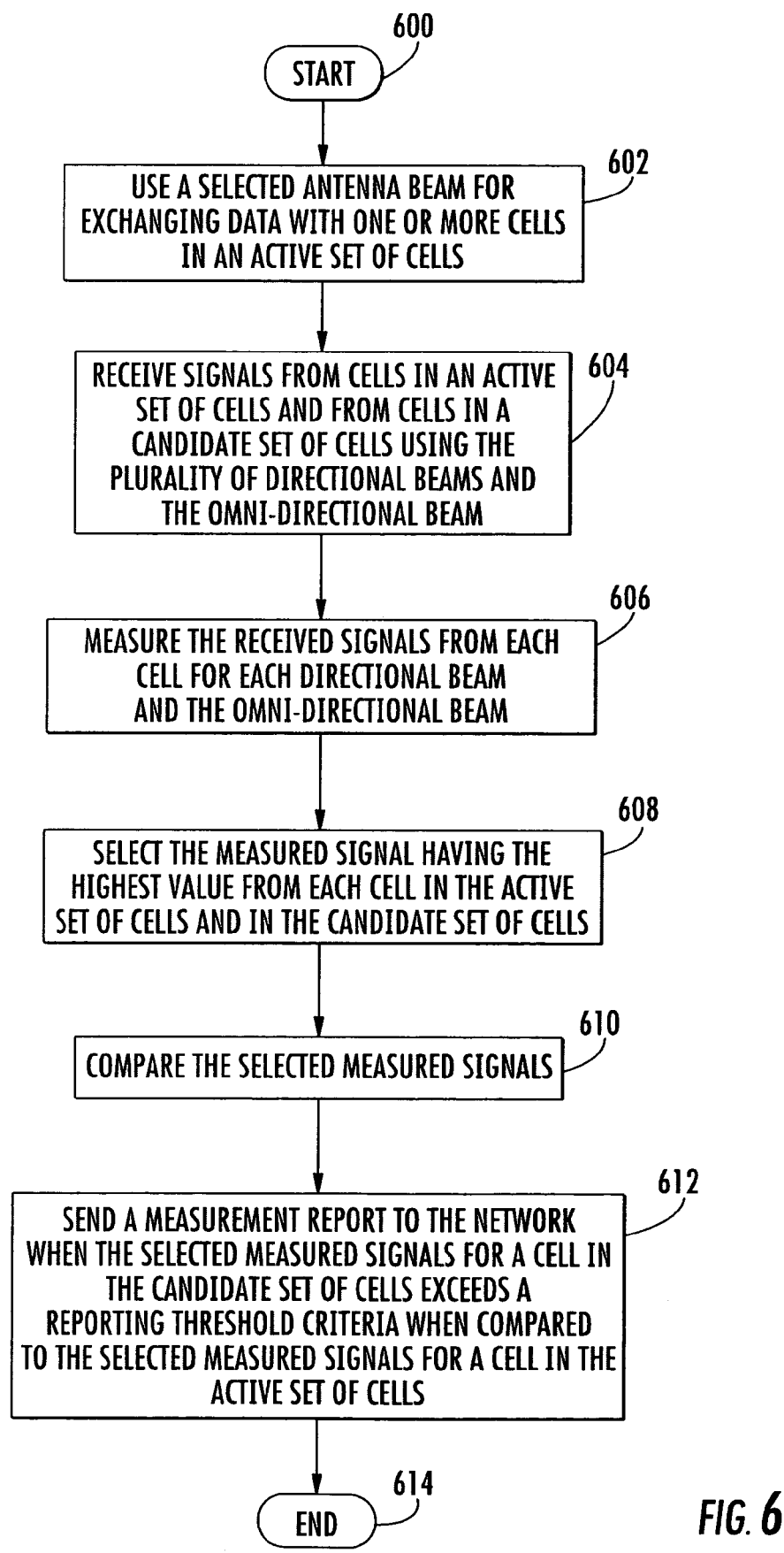

The third embodiment is illustrated in the flow diagram of FIG. 6. From the start (Block 600), a selected antenna beam is used for exchanging data with one ore more cells in an active set of cells at Block 602, signals are received from cells in the active set of cells and from cells in the candidate set of cells using the plurality of directional beams and the omni-directional beam at Block 604.

The received signals are measured for each directional beam and the omni-directional beam at Block 606. The measured signal having the highest value are selected from each cell in the active set of cells and in the candidate set of cells at Block 608. That is, for each cell, the highest measured signal (the omni-directional beam measurement or the highest directional beam measurement) is selected. The selected measured signals are compared at Block 6010. A measurement report is sent to the network at Block 612 when the selected measured signals for a cell in the candidate set of cells exceeds a reporting threshold criteria when compared to the selected measured signals for a cell in the active set of cells. The method ends at Block 614. This process repeats from Block 600 for the next set of measurements to be performed.

Figure 7:
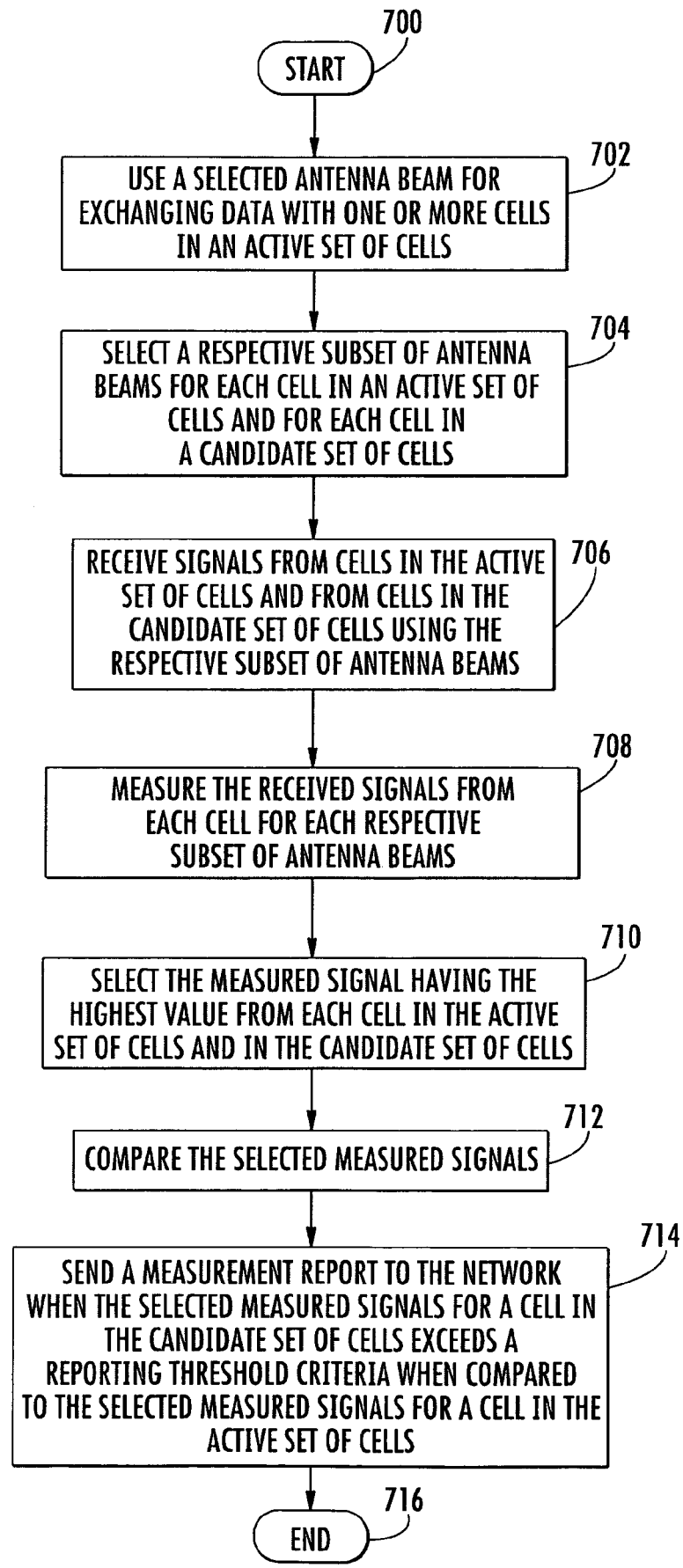

The fourth embodiment is illustrated in the flow diagram of FIG. 7. From the start (Block 700), a selected antenna beam is used for exchanging data with one or more cells in an active set of cells at Block 702, and a subset of antenna beams for each cell in the active set of cells and for each cell in the candidate set of cells is selected at Block 704. The subset of antenna beams for each cell can be the same for all cells, or can be different for each cell depending on parameters or criteria such as location of the cells and/or other information such as past measurements.

Signals from cells in the active set of cells and from cells in the candidate set of cells are received using the respective subset of antenna beams at Block 706. The received signals for each respective subset of antenna beams are measured at Block 708. The measured signal having the highest value from each cell in the active set of cells and in the candidate set of cells is selected at Block 710. That is, for each cell, the highest measured signal is selected.

The selected measured signals are compared at Block 712. A measurement report is sent to the network at Block 714 when the selected measured signals for a cell in the candidate set of cells exceeds a reporting threshold criteria when compared to the selected measured signals for a cell in the active set of cells. The method ends at Block 716. This process repeats from Block 700 for the next set of measurements to be performed.

Figure 8:
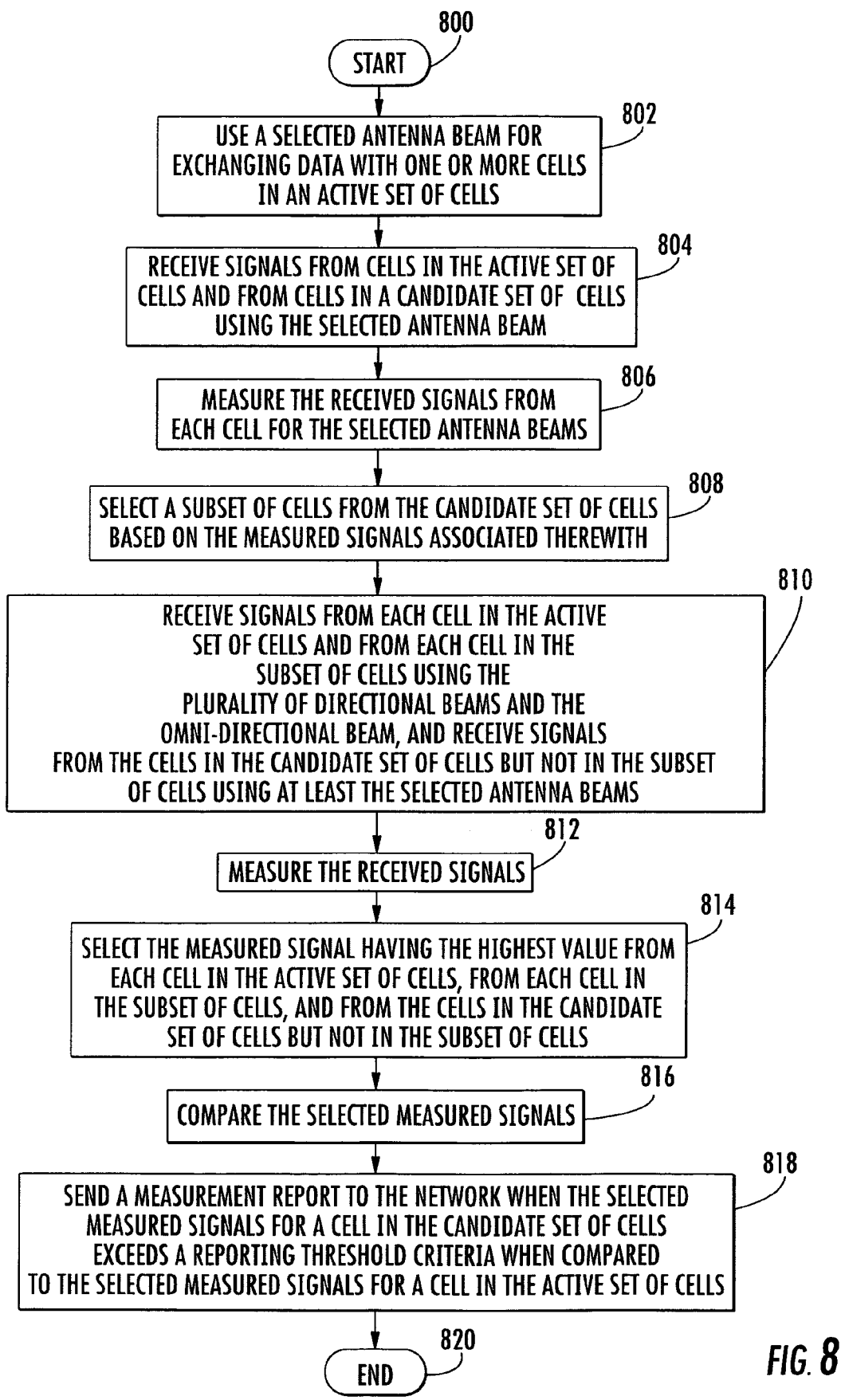

The fifth embodiment is illustrated in the flow diagram of FIG. 8. From the start (Block 800), a selected antenna beam is used for exchanging data with one or more cells in the active set of cells at Block 802. Signals are received from cells in the active set of cells and from cells in a candidate set of cells using the selected antenna beam at Block 804.

The received signals are measured for the selected antenna beam at Block 806. A subset of cells from the candidate set of cells are selected based on the measured signals at Block 808. When selecting the subset of cells, the WTRU 220 may make the selection based on, for example, their measurement results, cells having a measurement result above a predetermined threshold, or cells having a measurement result which exceeds an active set cell measurement by a predetermined threshold. Optionally, the subset of cells may include all of the measured cells.

Signals are received from each cell in the active set of cells and from each cell in the subset of cells using the plurality of directional beams and the omni-directional beam, and signals from the cells in the candidate set of cells but not in the subset of cells are received using at least the selected antenna beam (optionally, more beams could be used for these cells) at Block 810. The received signals are measured at Block 812.

The measured signal having the highest value is selected from each cell in the active set of cells, from each cell in the subset of cells, and from the cells in the candidate set of cells but not in the subset of cells at Block 814. That is, for each cell, the highest measured signal is selected.

The selected measured signals are compared at Block 816. A measurement report is sent to the network at Block 818 when the selected measured signals for a cell in the candidate set of cells exceeds a reporting threshold criteria when compared to the selected measured signals for a cell in the active set of cells. The method ends at Block 820. This process repeats from Block 800 for the next set of measurements to be performed.

Figure 9:
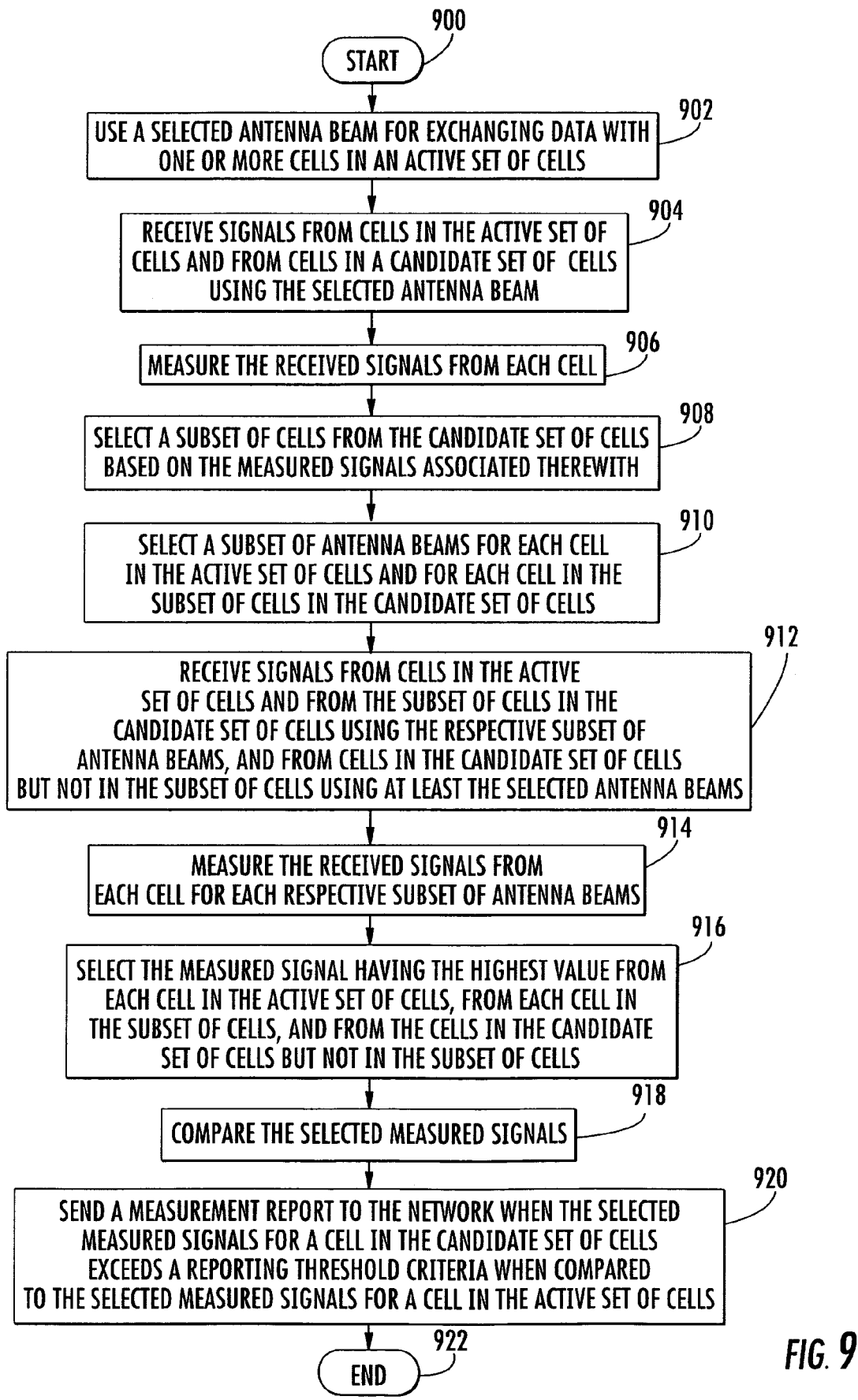

The sixth embodiment is illustrated in the flow diagram of FIG. 9. From the start (Block 900), a selected antenna beam is used for exchanging data with one or more cells in the active set of cells at Block 902. Signals from cells in the active set of cells and from cells in a candidate set of cells are received using the selected antenna beam at Block 904. The received signals are measured at Block 906.

A subset of cells is selected from the candidate set of cells based on the measured signals at Block 908. When selecting the subset of cells, the WTRU 220 may make the selection based on, for example, their measurement results, cells having a measurement result above a predetermined threshold, or cells having a measurement result which exceeds an active set cell measurement by a predetermined threshold. Optionally, the subset of cells may include all of the measured cells.

A subset of antenna beams is selected for each cell in the active set of cells and for each cell in the subset of candidate cells at Block 910. As discussed above, the subset of antenna beams for each cell can be the same for all cells, or can be different for each cell depending on parameters or criteria such as location of the cells and/or other information such as past measurements.

Signals are received from cells in the active set of cells and from the subset of cells in the candidate set of cells using the respective subset of antenna beams and from the cells in the candidate set of cells but not in the subset of cells are received using at least the selected antenna beam (optionally, more beams could be used for these cells) at Block 912. The received signals are measured for each respective subset of antenna beams at Block 914. The measured signal having the highest value from each cell in the active set of cells, from each cell in the subset of cells, and from the cells in the candidate set of cells but not in the subset of cells are selected at Block 916. That is, for each cell, the highest measured signal is selected.

The selected measured signals are compared at Block 918. A measurement report is sent to the network at Block 920 when the selected measured signals for a cell in the candidate set of cells exceeds a reporting threshold criteria when compared to the selected measured signals for a cell in the active set of cells. The method ends at Block 922. This process repeats from Block 900 for the next set of measurements to be performed.

In the first through the sixth embodiments described above, it is preferable that the WTRU 220 notifies the network when measured signals in the selected antenna beam from a cell in the active set of cells fall below a reporting threshold criteria. Other methods could be used, such as using the omni-directional beam measurements.

In the first through sixth embodiments, the threshold reporting criteria is any such criteria known to the WRT either a priori or by instruction which is typically provided by the network. The reporting threshold criteria may, for example, involve taking into account individual measurements of a cell, combinations of measurements of a cell, for example averages of individual measurements, and may involve any type of measurement or measurements, for example signal to interference ratio (SIR) or average SIR, signal-to-noise ratio, and signal strength. In addition, the threshold reporting criteria may include multiple parameters to consider, for example, a fixed threshold value, a threshold value based on other measurements, and a number of measurements or a percentage of measurements, such as 3 out of 5, during which a condition must remain true before making a measurement report.

As discussed in the background section, in some systems, such as CDMA2000, neighbor cells whose strength have crossed a network specified threshold but are not strong enough to be in the active set are referred to as the candidate set. Measurement reports are sent to the network when cells are added to the candidate set and when they are strong enough to be considered for the active set.

The WTRU advantageously evaluates and reports to the network measurement of signals received from the cells in the omni-directional beam and/or the directional beams with the strongest measurement for adding cells to the active set of cells. By adding cells to the active set of cells based on measuring signals in the first through the sixth embodiments, soft handoff is improved so that connectivity of the mobile WTRU operating with a switched beam antenna in a multi-cell wireless communication system is better maintained.

Another aspect of the invention is directed to a wireless communication system 200 comprising an active set of cells 260, a candidate set of cells 280, and a WTRU 220 as described above for implementing the first through the sixth embodiments. In particular, the WTRU 220 comprises a controller 380 for comparing the measured signals, and for sending a measurement report to the network when the selected measured signals for a cell in the candidate set of cells exceeds a reporting threshold criteria when compared to the selected measured signals for a cell in the active set of cells.

The first through the sixth embodiments perform measurements on cells in the candidate set. However, in some cases the signal from neighbor cells can be so greatly attenuated in the selected beam that it does not exceed the threshold to be added to the candidate set. This will again cause a late entry into soft handover and possibly deep penetration into the new cell before entering soft handover.

Figure 10:
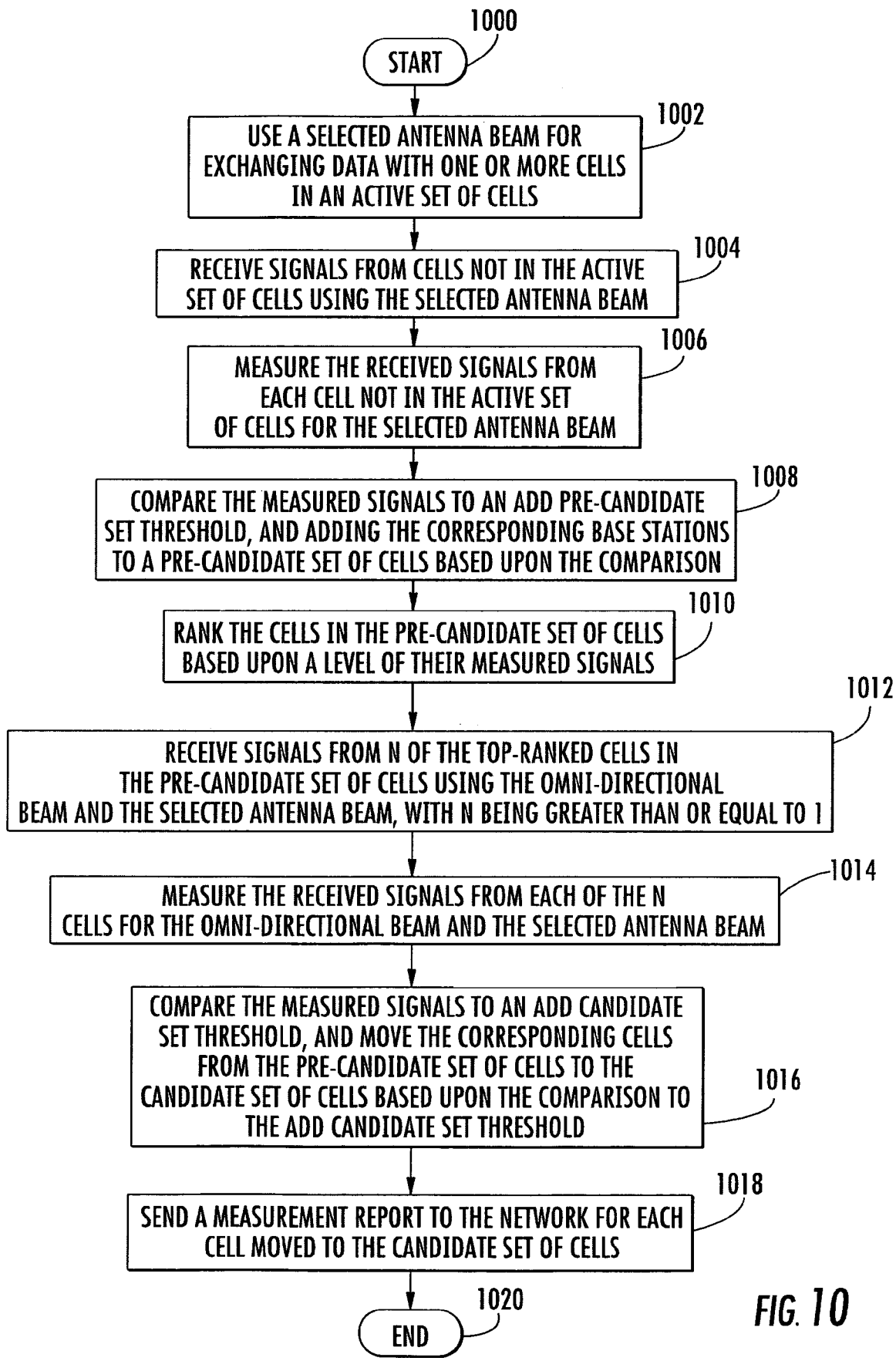
FIG. 10 is a flow diagram for adding base stations to a pre-candidate set of cells for the wireless communication system illustrated in FIG. 2.

Referring now to the flow chart in FIG. 10, yet another aspect of the invention is directed to a method for performing measurements in neighbor cells other than cells in the candidate set such that neighbor cells can be identified for the candidate set before they would normally be if only selected beam measurements were performed. The neighbor cells not in the candidate set of cells or in the active set of cells are in a "pre-candidate" set of cells. The following thresholds are used:

Let Tthresh=a WTRU defined threshold for a pre-candidate set (also known as the add pre-candidate set threshold);

Let Tadd=a network defined threshold for adding a cell to the candidate set and reporting measurement to the network (also known as the add candidate set threshold);

Let Tdrop_c=a network defined threshold for removing a cell from the candidate set and reporting measurement to the network (also known as the drop candidate set threshold);

Let Tdrop_a=a network defined threshold for reporting measurement of a cell in the active set of cells to the network with the expected result that the network will direct the WTRU to remove the cell from the active set of cells (also known as the drop active set threshold);

Let T_COMP=a network defined value which specifies the difference by which a candidate cell is to exceed a cell in the active set of cells to trigger a measurement report to the network that can be expected to result in the network directing the WTRU to add the candidate cell to the active set of cells; and Let T_COMPA=a WTRU defined threshold value$\geq$T_COMP.

The procedure for adding cells to the pre-candidate set, the candidate set and the active set of cells is shown in FIG. 10. From the start (Block 1000), a selected antenna beam is used for exchanging data with one or more cells in the active set of cells at Block 1002. Signals are received from a plurality of cells not in the active set of cells using the selected antenna beam at Block 1004. The signals received from the cells not in the active set of cells are measured at Block 1006.

The measured signals are compared to the Tthresh threshold at Block 1008. When the signal strength of a cell not in the active set (measured in the selected antenna beam) exceeds Tthresh, the cell is put in the pre-candidate set maintained by the WTRU 220. Tthresh is less than or equal to Tadd. The cells in the pre-candidate set of cells are then ranked based on a level of their measured signals at Block 1010.

Signals are received from N of the top-ranked cells in the pre-candidate set of cells using the omni-directional beam and the selected antenna beam at Block 1012. N is greater than or equal to 1. The received signals are measured from each of the N cells for the omni-directional beam and the selected antenna beam at Block 1014.

The measured signals are compared to a Tadd threshold, and the corresponding cells from the pre-candidate set of cells are moved from the pre-candidate set to the candidate set of cells based upon the comparison to (i.e., if they exceed) the Tadd threshold at Block 1016. A measurement report (with the omni directional beam measurement) is sent to the network for each cell moved to the candidate set at Block 1018.

In addition, when the signal strength of a candidate cell measured in the omni-directional beam 250 is T_COMP greater than the signal strength of any one or more cells in the active set of cells measured in the omni-directional beam, a measurement report (with the omni measurement of the candidate cell) is sent to the network. The network typically directs the WTRU 220 to move this candidate cell to the active set of cells. The use of the pre-candidate set of cells thus enables the WTRU 220 to add cells to the active set of cells closer to the point in time that an omni-only WTRU would. The method ends at Block 1020. The method repeats at Block 1000 for the next set of measurements.

The procedure for removing (dropping) cells from the candidate and pre-candidate sets of cells is as follows. When the selected beam signal strength of a pre-candidate cell falls below Tthresh, the pre-candidate cell is removed from the pre-candidate set (regardless of whether it is being measured in the selected beam only or the selected antenna beam and the omni-directional beam).

When the omni-directional beam signal strength of a candidate cell falls below Tdrop_c, the cell is dropped from the candidate set of cells, and a measurement report is sent (with the omni-directional beam measurement) to the network. This cell is put in the pre-candidate set of cells if the selected beam signal strength exceeds Tthresh.

The procedure for dropping cells from the active set of cells is as follows. If a) the selected antenna beam signal strength of a cell in the active set of cells falls below Tdrop_a AND the omni-directional beam signal strength of that cell is below Tadd; and/or if b) the selected beam signal strength of a cell in the active set of cells falls below Tdrop_a AND the omni-directional beam signal strength of that cell is T_COMPA less than the omni-directional beam signal strength of the best cell in the active set (SIR_Best); and and/or if c) the selected antenna beam signal strength of a cell in the active set of cells falls below Tthresh AND Tthresh≦Tdrop_a, then the following is true.

The measurement report (with the selected antenna beam measurement) is sent to the network. It is expected that the network will direct the WTRU 220 to remove the cell from the active set of cells. Once removed, this cell is placed in the pre-candidate set of cells only if the selected antenna beam signal strength exceeds Tthresh.

The omni-directional beam measurements are used for adding cells to different sets of cells, and the selected antenna beam measurements are used for dropping cells from the different sets of cells. To avoid a ping-pong effect, each of the dropping considerations a), b), and c) ensures that the cell will not be immediately added back to the candidate or active set of cells.

For a), the omni-directional beam measurement must be below Tadd, which prevents adding the cell back to the candidate set. For b), the omni-directional beam measurement must be well below the best cell in the active set; unless there are worse cells in the active set of cells, this cell would not be added back to the active set of cells. For c), a cell with a signal strength below Tthresh would not even be added back into the pre-candidate set of cells.

The procedure above for dropping cells from the active set of cells assumes that one cell always remains in the active set. An example for dropping cells is as follows: Tadd=−14 dB, Tdrop_a=−16 dB, Tthresh=−22 dB, and T_COMPA=3 dB.

The WTRU 220 would report the selected antenna beam measurement which would most likely result in a cell drop from the active set of cells when: an active set cell signal strength is below −16 dB in the selected antenna beam AND below −14 dB in the omni-directional beam; an active set cell signal strength is below −16 dB in the selected antenna beam AND more than 3 dB lower than best active set cell in the omni-directional beam; and an active set cell signal strength is below −22 dB in the selected antenna beam regardless of the omni-directional beam measurement.

In all of the aforementioned procedures, actions taken based on comparisons with a threshold may be based on a measurement or after a waiting period in which the condition (e.g., exceeding or falling below the threshold) must hold true for a specified number of measurements or for a percentage of measurements within a specified number of measurements.

Many modifications and other embodiments of the invention will come to the mind of one skilled in the art having the benefit of the teachings presented in the foregoing descriptions and the associated drawings. In addition, other features relating to switched beam antenna are disclosed in copending patent application filed concurrently herewith and assigned to the assignee of the present invention and is entitled METHOD FOR PERFORMING MEASUREMENTS FOR HANDOFF OF A MOBILE UNIT OPERATING WITH A SWITCHED BEAM ANTENNA IN A WIRELESS COMMUNICATION SYSTEM, AND CORRESPONDING SYSTEM, Ser. No. 11/051,024, the entire disclosure of which is incorporated herein in its entirety by reference. Therefore, it is to be understood that the invention is not to be limited to the specific embodiments disclosed, and that modifications and embodiments are intended to be included within the scope of the appended claims.

That which is claimed is:

1. A method for operating a wireless transmit/receive unit (WTRU) in a wireless communication system comprising a plurality of cells, the WTRU comprising a switched beam antenna for generating antenna beams including a plurality of directional beams and an omni-directional beam, the method comprising:

Using a selected antenna beam for exchanging data with a cell in an active set of cells;

receiving signals from cells not in the active set of cells using the selected antenna beam;

measuring the received signals from each cell not in the active set of cells for the selected antenna beam;

comparing the measured signals to an add pre-candidate set threshold, and adding the corresponding cells to a pre-candidate set of cells based upon the comparison;

ranking the cells in the pre-candidate set of cells based upon a level of their measured signals;

receiving signals from N of the top-ranked cells in the pre-candidate set of cells using the omni-directional beam and the selected antenna beam, with N being greater than or equal to 1;

measuring the received signals from each of the N cells for the omni-directional beam and the selected antenna beam;

comparing the measured signals to an add candidate set threshold, and moving the corresponding cells from the pre-candidate set of cells to the candidate set of cells based upon the comparison to the add candidate set threshold; and sending a measurement report to the network.

2. A method according to claim 1 further comprising:
receiving signals from the cells in the candidate set of cells using the omni-directional beam;
measuring the received signals from each cell for the omni-directional beam; and
comparing the measured signals to an add active set threshold, and sending a measurement report to the network based upon the comparison to the add candidate set threshold.

3. A method according to claim 1 wherein the add candidate set threshold is greater than the add pre-candidate set threshold.

4. A method according to claim 1 wherein the add pre-candidate set threshold is set by the WTRU.

5. A method according to claim 1 wherein the selected antenna beam comprises a directional beam; and further comprising dropping cells in the pre-candidate set of cells based upon:
receiving signals from the pre-candidate set of cells using the selected directional beam;
measuring the received signals from each cell for the selected directional beam;
comparing the measured signals to a drop pre-candidate set threshold; and
dropping the corresponding cells from the pre-candidate set of cells based upon the comparison to the drop pre-candidate set threshold.

6. A method according to claim 1 wherein the selected antenna beam comprises a directional beam; and further comprising dropping cells in the candidate set of cells based upon:
receiving signals from cells in the candidate set of cells using the omni-directional beam and the selected directional beam;
measuring the received signals from each cell in the candidate set of cells for the omni-directional and the selected directional beam;
comparing the measured signals from each cell for the omni-directional beam to a drop candidate set threshold; and
dropping the corresponding cells from the candidate set of cells based upon the comparison to the drop candidate set threshold, and sending a measurement report to the network.

7. A method according to claim 6 further comprising adding the cells dropped from the candidate set of cells to the pre-candidate set of cells based upon a comparison of the measured signals from each dropped cell for the selected directional beam to the add pre-candidate threshold.

8. A method according to claim 1 wherein the selected antenna beam comprises a directional beam; and further comprising:
receiving signals from cells in the active set of cells using the omni-directional beam and the selected directional beam;
measuring the received signals from each cell in the active set of cells for the omni-directional and the selected directional beam;
comparing the measured signals from each cell for the selected directional beam to a drop active set threshold and to the add candidate set threshold; and
sending a measurement report to the network for the corresponding cells from the active set of cells based upon the comparison to the drop active set threshold and the add candidate set threshold.

9. A method according to claim 1 wherein the selected antenna beam comprises a directional beam; and further comprising:
receiving signals from cells in the active set of cells using the omni-directional beam and the selected directional beam;
measuring the received signals from each cell in the active set of cells for the omni-directional and the selected directional beam;
comparing the measured signals from each cell for the selected directional beam to a drop active set threshold, and comparing the measured signals from each cell for the omni-directional beam to each other; and
sending a measurement report to the network for the corresponding cells in the active set of cells based upon a comparison to the drop active set threshold, and based upon a comparison to a threshold corresponding to a level of the strongest measured signal for the omni-directional beam less a predetermined level.

10. A method according to claim 1 wherein the wireless communication system comprises a code division multiple access (CDMA) system.

11. A method according to claim 1 wherein the received signals being measured comprise a pilot signal.

12. A method according to claim 1 wherein the measuring comprises measuring at least one of a signal to interference ratio (SIR), a signal to noise ratio, and a signal strength of the received signals.

13. A method according to claim 1 further comprising sending a measurement report to the network when a measured signal from a cell in the active set of cells for the selected antenna beam falls below a threshold.

14. A method according to claim 1 wherein the selected antenna beam comprises a directional beam; and wherein the measurement reports for cells in the active set of cells are sent to the network based upon:
receiving signals from cells in the active set of cells using the omni-directional beam and the selected directional beam;
measuring the received signals from each cell in the active set of cells for the omni-directional and the selected directional beam;
comparing the measured signals from each cell for the selected directional beam to a drop active set threshold, and comparing the measured signals from each cell for the omni-directional beam to each other; and
reporting to the network measurements of the corresponding cells in the active set of cells based upon a comparison to the drop active set threshold, and based upon a comparison to a threshold corresponding to a level of the strongest measured signal for the omni-directional beam less a predetermined level.

15. A method according to claim 1 wherein the selected antenna beam comprises a directional beam; and further comprising:
receiving signals from cells in the active set of cells using the omni-directional beam and the selected directional beam;
measuring the received signals from each cell in the active set of cells for the omni-directional and the selected directional beam;
comparing the measured signals from each cell for the selected directional beam to the add pre-candidate set threshold; and sending a measurement report to the network for the corresponding cells in the active set of cells based upon a comparison to the add pre-candidate set threshold if the add pre-candidate set threshold is less than a drop active set threshold.

16. A method according to claim 1 wherein the comparing further comprises comparing to a threshold, before sending the measurement report, with the threshold being based upon at least one of a condition that holds true for a predetermined number of measurements, and a percentage of measurements within a predetermined number of measurements.

17. A wireless communication system comprising:
an active set of cells;
a non-active set of cells; and
a wireless transmit/receive unit (WTRU) comprising
a switched beam antenna for generating antenna beams including a plurality of directional beams and an omni-directional beam, an antenna beam being selected for exchanging data with one or more cells in the active set of cells,
a transceiver connected to said switched beam antenna for receiving signals from cells-not in the active set of cells using the selected antenna beam,
a measuring unit connected to said transceiver for measuring the received signals from each cell not in the active set of cells for the selected antenna beam, and
a controller for comparing the measured signals to an add pre-candidate set threshold, and adding the corresponding cells to a pre-candidate set of cells based upon the comparison, and ranking the cells in the pre-candidate set of cells based upon a level of their measured signals,
said transceiver also receiving signals from N of the top-ranked cells in the pre-candidate set of cells using the omni-directional beam and the selected antenna beam, with N being greater than or equal to 1,
said measuring unit also measuring the received signals from each of the N cells for the omni-directional beam and the selected antenna beam, and
said controller also comparing the measured signals to an add candidate set threshold, and moving the corresponding cells from the pre-candidate set of cells to the candidate set of cells based upon the comparison to the add candidate set threshold, and sending a measurement report to the network.

18. A wireless communication system according to claim 17 wherein said transceiver receives signals from the cells in the candidate set of cells using the omni-directional beam; wherein said measuring unit measures the received signals from each cell for the omni-directional beam, and wherein said controller compares the measured signals to an add active set threshold, and sends a measurement report to the network based upon the comparison to the add active set threshold.

19. A wireless communication system according to claim 17 wherein the add candidate set threshold is greater than the add pre-candidate set threshold.

20. A wireless communication system according to claim 17 wherein the add pre-candidate set threshold is set by the WTRU.

21. A wireless communication system according to claim 17 wherein the selected antenna beam comprises a directional beam; and wherein cells are dropped from the pre-candidate set of cells based upon:
said transceiver receiving signals from the pre-candidate set of cells using the selected directional beam;
said measuring unit measuring the received signals from each cell for the selected directional beam; and
said controller comparing the measured signals to a drop pre-candidate set threshold, and dropping the corresponding cells from the pre-candidate set of cells based upon the comparison to the drop pre-candidate set threshold.

22. A wireless communication system according to claim 17 wherein the selected antenna beam comprises a directional beam; and wherein cells are dropped from the candidate set of cells based upon:
said transceiver receiving signals from cells in the candidate set of cells using the omni-directional beam and the selected directional beam;
said measuring unit measuring the received signals from each cell in the candidate set of cells for the omni-directional and the selected directional beam; and
said controller comparing the measured signals from each cell for the omni-directional beam to a drop candidate set threshold, and dropping the corresponding cells from the candidate set of cells based upon the comparison to the drop candidate set threshold.

23. A wireless communication system according to claim 22 wherein the WTRU adds the cells dropped from the candidate set of cells to the pre-candidate set of cells based upon a comparison by said controller of the measured signals from each dropped cell for the selected directional beam to the add pre-candidate threshold.

24. A wireless communication system according to claim 17 wherein the selected antenna beam comprises a directional beam and wherein the measurement reports for cells in the active set of cells are sent to the network based upon:
said transceiver receiving signals from cells in the active set of cells using the omni-directional beam and the selected directional beam;
said measuring unit measuring the received signals from each cell in the active set of cells for the omni-directional and the selected directional beam; and
said controller comparing the measured signals from each cell for the selected directional beam to a drop active set threshold and to the add candidate set threshold, and sending a measurement report to the network based upon the comparison to the drop active set threshold and the add candidate set threshold.

25. A wireless communication system according to claim 17 wherein the selected antenna beam comprises a directional beam; and wherein the measurement reports for cells in the active set of cells are sent to the network based upon:
said transceiver receiving signals from cells in the active set of cells using the omni-directional beam and the selected directional beam;
said measuring unit measuring the received signals from each cell in the active set of cells for the omni-directional and the selected directional beam;
said controller comparing the measured signals from each cell for the selected directional beam to a drop active set threshold, and comparing the measured signals from each cell for the omni-directional beam to each other, reporting to the network measurements of the corresponding cells in the active set of cells based upon a comparison to the drop active set threshold, and based upon a comparison to a threshold corresponding to a level of the strongest measured signal for the omni-directional beam less a predetermined level.

26. A wireless communication system according to claim 17 wherein the selected antenna beam comprises a directional beam; and wherein the measurement reports for cells in the active set of cells are sent to the network based upon:
- said transceiver receiving signals from cells in the active set of cells using the omni-directional beam and the selected directional beam;
- said measurement unit measuring the received signals from each cell in the active set of cells for the omni-directional and the selected directional beam; and
- said controller comparing the measured signals from each cell for the selected directional beam to the add pre-candidate set threshold, and sending a measurement report to the network for the corresponding cells in the active set of cells based upon a comparison to the add pre-candidate set threshold if the add pre-candidate set threshold is less than a drop active set threshold.

27. A wireless communication system according to claim 17 wherein the comparing further comprises comparing to a threshold, before sending the measurement report, with the threshold being based upon at least one of a condition that holds true for a predetermined number of measurements, and a percentage of measurements within a predetermined number of measurements.

* * * * *